United States Patent
Edelmann et al.

(10) Patent No.: US 11,072,315 B2
(45) Date of Patent: Jul. 27, 2021

(54) VALVE FOR ADJUSTING A FLUID FLOW

(71) Applicant: Robert Bosch GmbH, Stuttgart (DE)

(72) Inventors: Volker Edelmann, Buchen (DE); Andrej Gardt, Abstatt (DE); Guenther Schnalzger, Blaichach (DE); Valentin Schubitschew, Tamm (DE); Christoph Eisele, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/498,277

(22) PCT Filed: Mar. 15, 2018

(86) PCT No.: PCT/EP2018/056578
§ 371 (c)(1),
(2) Date: Sep. 26, 2019

(87) PCT Pub. No.: WO2018/197103
PCT Pub. Date: Nov. 1, 2018

(65) Prior Publication Data
US 2021/0101573 A1    Apr. 8, 2021

(30) Foreign Application Priority Data

Apr. 28, 2017 (DE) .................... 10 2017 207 208.3

(51) Int. Cl.
*B60T 8/36* (2006.01)
*F16K 31/06* (2006.01)

(52) U.S. Cl.
CPC .......... *B60T 8/366* (2013.01); *F16K 31/0655* (2013.01); *F16K 31/0693* (2013.01)

(58) Field of Classification Search
CPC .......................... F16K 31/0655; F16K 31/0693
(Continued)

(56) References Cited

U.S. PATENT DOCUMENTS 6,811,134 B2 * 11/2004 Stoecklein ........... F02M 47/027
239/102.2
10,197,186 B2 * 2/2019 Dinerman ............... B60T 8/363
(Continued)

FOREIGN PATENT DOCUMENTS

DE    10 2013 204 973 A1    9/2014
DE    10 2013 223 016 A1    5/2015
(Continued)

OTHER PUBLICATIONS

International Search Report corresponding to PCT Application No. PCT/EP2018/056578, dated May 8, 2018 (German and English language document) (7 pages).

*Primary Examiner* — Kevin R Barss
(74) *Attorney, Agent, or Firm* — Maginot, Moore & Beck LLP

(57) ABSTRACT

A valve for adjusting a fluid flow includes a valve cartridge with at least one first fluid opening, at least one second fluid opening, a preliminary stage with a first valve seat and a first closing element, and a main stage with a second valve seat and a second closing element. The first valve seat is at a first axial through-opening of the second closing element, which is at least partly in a preliminary stage sleeve. The first valve seat is within the preliminary stage sleeve, and a flow path from the at least one first fluid opening to the preliminary stage leads through at least one inflow opening, which is radially introduced in the preliminary stage sleeve. An axial filter gap formed between an actuation element and the preliminary stage sleeve overlaps the at least one inflow opening at least in some regions and together form a filter.

10 Claims, 2 Drawing Sheets

(58) Field of Classification Search
USPC .................................................. 259/129.15
See application file for complete search history.

(56) References Cited

U.S. PATENT DOCUMENTS

| | | | | |
|---|---|---|---|---|
| 2010/0264341 | A1* | 10/2010 | Kratzer | B60T 8/3615 |
| | | | | 251/129.15 |
| 2013/0207016 | A1* | 8/2013 | Schubitschew | F16K 31/02 |
| | | | | 251/129.15 |
| 2013/0306891 | A1* | 11/2013 | Fietz | B60T 8/365 |
| | | | | 251/120 |
| 2015/0300295 | A1* | 10/2015 | Nakano | F16K 27/029 |
| | | | | 251/129.15 |
| 2016/0377190 | A1* | 12/2016 | Speer | F16K 31/0655 |
| | | | | 251/129.15 |

FOREIGN PATENT DOCUMENTS

| | | |
|---|---|---|
| WO | 2012/159908 A1 | 11/2012 |
| WO | 2015/039988 A1 | 3/2015 |

\* cited by examiner

VALVE FOR ADJUSTING A FLUID FLOW

This application is a 35 U.S.C. § 371 National Stage Application of PCT/EP2018/056578, filed on Mar. 15, 2018, which claims the benefit of priority to Serial No. DE 10 2017 207 208.3, filed on Apr. 28, 2017 in Germany, the disclosures of which are incorporated herein by reference in their entirety.

The disclosure proceeds from a valve for setting a fluid stream.

BACKGROUND

Valves configured as solenoid valves are used for setting a fluid stream for different functions in hydraulic vehicle brake systems with an ESP (Electronic Stability Program) functionality, an ASR (Anti Slip Regulation) functionality and/or an ABS (Antilock Brake System) functionality for driving dynamics control. A solenoid valve of this type as a technical component serves to control an inlet or outlet of fluids or to control and/or to regulate the flow direction and/or fluid quantity. A very wide variety of systems are known from the area of hydraulic vehicle brake systems of this type, in the case of which systems an active or partially active buildup of pressure in a fluid assembly or hydraulic assembly is realized via a solenoid valve which is configured as a two-stage high pressure switching valve and comprises a preliminary stage and a main stage. In the case of an activation or actuation, for example, the high pressure switching valve releases a flow path between a brake master cylinder or a primary circuit and a pump element or secondary circuit. The two-stage configuration makes opening of the solenoid valve and releasing of the flow path possible even in the case of high differential pressures. Here, the primary circuit is connected to a first fluid opening and the secondary circuit is connected to a second fluid opening, between which a first closing element of the preliminary stage and a second closing element of the main stage are arranged. Here, the first fluid opening is as a rule assigned a filter, in particular a radial filter, which serves to retain relatively large dirt particles which are not to pass into the primary circuit. If the flow path leads from the second fluid connector to the first fluid connector on account of the pressure conditions, dirt particles are correspondingly collected on the filter. If the pressure conditions change, with the result that the flow path leads from the first fluid connector to the second fluid connector, the dirt particles are removed again and are guided in the direction of the preliminary stage. Since, however, the preliminary stage as a rule has a small stroke and a small throughflow opening, relatively large dirt particles can cause jamming or clogging of the preliminary stage, which can lead to a functional failure of the valve.

WO 2015/039988 A1 has disclosed a valve of the generic type for setting a fluid stream, in particular a hydraulic fluid stream, which valve has a first connector opening and a second connector opening, a preliminary stage with a first valve seat and a first movable closing body, and a main stage with a second valve seat and a second movable closing body. The second closing body has a through opening which is assigned the first valve seat. It is provided that a filtering gap is configured in a flow path from the first connector opening to the preliminary stage by way of a constriction of the flow path. The second closing body is arranged such that it can be moved axially in regions in a preliminary stage sleeve, the first valve seat lying within the preliminary stage sleeve. The flow path leads through at least one radial opening into the preliminary stage sleeve. The hydraulic medium therefore passes through the radial opening into the interior space of the preliminary stage sleeve, in which interior space the first valve seat and therefore the preliminary stage are situated. The radial opening can be of slot-like configuration, in order to form the filtering gap. As a result, the dirt particles are already prevented from passing to the preliminary stage on the outer side of the preliminary stage sleeve. In addition, a plurality of radial openings can be provided which in each case form a filtering gap. The at least one radial opening can be configured axially at the level of an actuating element which protrudes into the preliminary stage sleeve and is assigned to the first closing body, the filtering gap being formed by way of the radial opening, or preferably being configured as an axial filtering gap between the actuating element and the preliminary stage sleeve. To this end, the external diameter of the actuating element and the internal diameter of the preliminary stage sleeve are selected accordingly in such a way that the filtering gap is formed in at least one axial section. The actuating element is configured as a magnet armature which, in the case of energization of a stationary magnet coil of the valve, is moved axially, in particular, in order to press the first closing body against the first valve seat, in particular counter to a spring force, or to release said first closing body from said first valve seat.

SUMMARY

The valve for setting a fluid stream disclosed herein has the advantage that defined fluid filtering is made possible upstream of the preliminary stage, which defined fluid filtering can prevent possible jamming by way of the contaminants or dirt particles which are situated in the brake fluid and therefore prevent an impermissible leakage of the valve preliminary stage in all operating states.

The core of the disclosure is a filter which is arranged in the flow path of the valve, is configured by way of at least one inflow opening and an axial filter gap, and filters impermissibly large dirt particles out of the brake fluid. As a result, a preliminary stage seat of the valve can advantageously be protected against contaminants or dirt particles from the system and against the leakage which results as a consequence by way of a simple structural embodiment of the at least one inflow opening and the axial filter gap between two overlapping components in the valve. A further advantage of the disclosure consists in dispensing with a filter as a separate or additional component in the valve and with the associated costs as a result of handling and assembly. In comparison with the alternative of filtering the entire volumetric flow of the valve by way of an additional filter on a secondary circuit side of the valve, embodiments of the present disclosure result in the advantage that particles which are already situated in the valve owing to assembly are not caught in the valve, but rather can be flushed from the valve and can be filtered out regularly at another filter upstream of a component. Furthermore, the main stage volumetric flow is not throttled impermissibly by way of the additional filter on the secondary circuit side of the valve.

Embodiments of the present disclosure provide a valve for setting a fluid stream with a valve cartridge which comprises at least one first fluid opening, at least one second fluid opening, a preliminary stage with a first valve seat and an axially movable first closing element, and a main stage with a second valve seat and an axially movable second closing element. The first valve seat is arranged at a first axial through opening of the second closing element. The second closing body is arranged at least in sections in a preliminary stage sleeve, the first valve seat being arranged within the preliminary stage sleeve. A flow path from the at least one first fluid opening to the preliminary stage leads through at least one inflow opening in the preliminary stage sleeve, which inflow opening is made radially in the preliminary stage sleeve. In addition, an axial filter gap is configured between an actuating element and the preliminary stage sleeve. Here, the at least one inflow opening and the axial filter gap overlap at least in regions and together configure a filter in the flow path.

Various dimensions for contaminants or dirt particles which are not allowed through the filter in the direction of the preliminary stage can be defined in an advantageous way by way of the combination of the at least one inflow opening with the filter gap which lies directly behind it. Said contaminants or dirt particles remain in or upstream of the inflow bore, and are flushed out again in the case of the next actuation of the valve.

The valve for setting a fluid stream is preferably configured as a solenoid valve which comprises a magnet assembly, the actuating element then being configured as a magnet armature. By way of energization of the magnet assembly, a magnetic field can be generated by means of the pole core, which magnetic field moves the actuating element which is configured as a magnet armature.

It is particularly advantageous that a width of the filter gap can define a first dimension, and a diameter of the at least one inflow opening can define a second dimension of contaminants or dirt particles to be filtered. The diameter of the at least one inflow opening limits the length of the contaminants or dirt particles to a maximum value, with the result that very long particles cannot even pass to the filter gap and clog the latter. Said long contaminants or dirt particles are flushed away from the inflow bores again in the case of the next valve actuation. The filter gap prevents the passage of contaminants or dirt particles which are shorter than the maximum length value but are wider than the axial filter gap, the width of which is defined by way of the radial spacing between the connecting region of the actuating element and the preliminary stage sleeve. Therefore, the dimensions of the contaminants or dirt particles which are to be filtered out can be defined simply via the dimensions of the at least one inflow opening and the filter gap.

In one advantageous refinement of the valve, an end region of the axial filter gap, which end region overlaps with the inflow opening, can be configured as a feed bevel which brings about a flow deflection. The flow deflection can bring it about that long contaminants or dirt particles do not pass "around the corner" and therefore get caught at the inflow opening and not in the filter gap and can clog the latter. In addition, the bevel can serve as an insertion bevel for the assembly of the preliminary stage sleeve.

In a further advantageous refinement of the valve, at its open end, the preliminary stage sleeve can be attached fixedly to the connecting region of the actuating element. Said fixed connection between the actuating element and the preliminary stage sleeve results in a precise filter gap, the width of which can be set simply in the manufacturing process depending on the design. The attachment of the preliminary stage sleeve to the connecting region of the actuating element can be configured, for example, as a press-fit connection or a weld or a threaded connection.

In a further advantageous refinement of the valve, the axial filter gap can be made as an axial groove in the connecting region of the actuating element. In addition, a plurality of inflow openings can be made in the preliminary stage sleeve, in each case one filter gap which is configured as an axial groove being able to be aligned with one of the inflow bores, in order to configure a joint filter. As an alternative, the axial filter gap can be configured as a circumferential stepped portion on an end section of the connecting region of the actuating element. It is also the case in said embodiment that a plurality of inflow bores can open into the circumferential stepped portion and can in each case configure a common filter with the axial filter gap.

In a further advantageous refinement of the valve, a valve lower part which is configured as a sleeve can be connected in a fluid-tight manner to the valve sleeve. Furthermore, a valve body can be arranged with a second axial through opening within the valve lower part which is configured as a sleeve, the second valve seat being able to be configured at the second axial through bore.

One exemplary embodiment of the disclosure is shown in the drawing and will be described in greater detail in the following description. In the drawing, identical designations denote components or elements which carry out identical or analogous functions.

DETAILED DESCRIPTION

Figure 1:
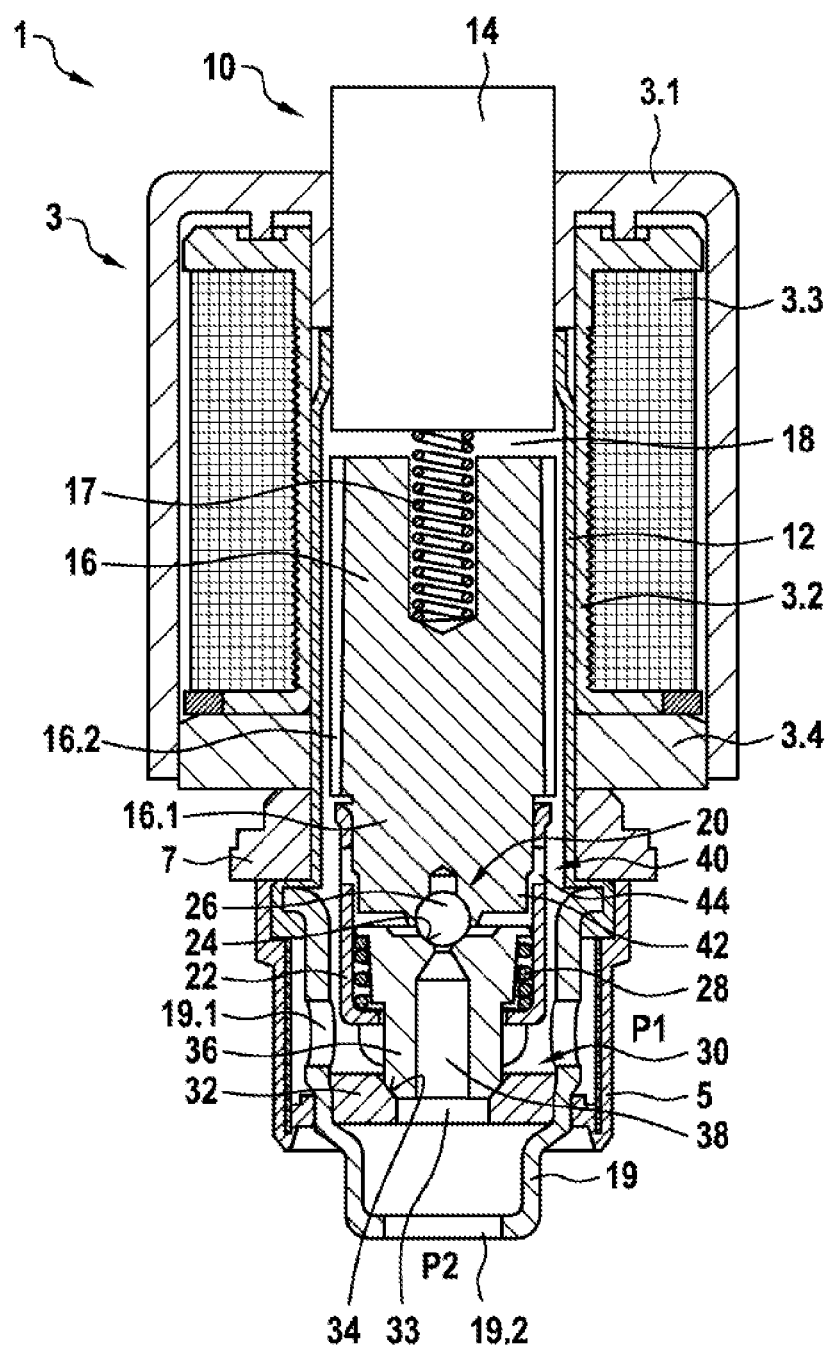
FIG. 1 shows a diagrammatic perspective sectional illustration of one exemplary embodiment of a valve according to the disclosure for setting a fluid stream.
Figure 2:
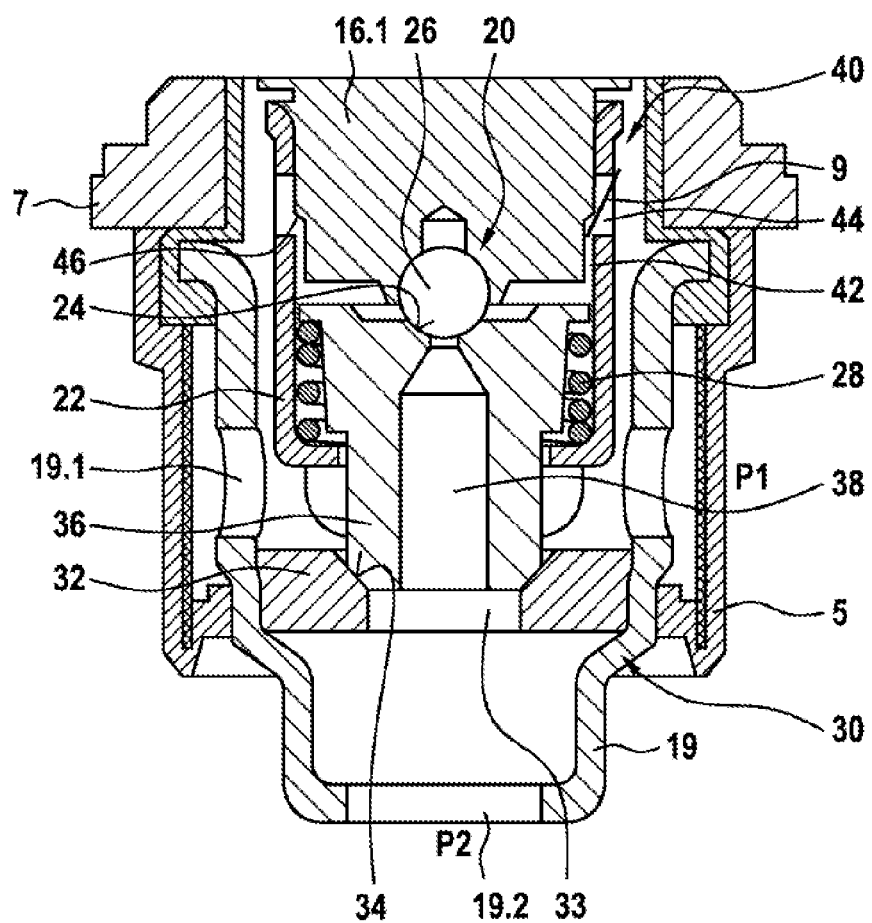
FIG. 2 shows a diagrammatic perspective detailed illustration of the valve according to the disclosure for setting a fluid stream from FIG. 1.

As can be seen from FIGS. 1 and 2, the illustrated exemplary embodiment of a valve 1 according to the disclosure for setting a fluid stream is configured as a normally closed two-stage solenoid valve with a magnet assembly 3 and an actuating element 16 which is configured as a magnet armature. The magnet assembly 3 comprises a hood-shaped housing shell 3.1, a winding carrier 3.2, onto which a coil winding 3.3 is attached, and a covering plate 3.4 which closes the housing shell 3.1 on its open side. The valve 1 can be used, for example, as a high pressure switching valve in a hydraulic brake system of a vehicle.

As can be seen, furthermore, from FIGS. 1 and 2, the illustrated exemplary embodiment of the valve 1 according to the disclosure for setting a fluid stream comprises a valve cartridge 10 which comprises a pole core 14, a valve sleeve 12 which is connected to the pole core 14, the actuating element 16 which is guided within the valve sleeve 12 in an axially movable manner, and a valve lower part 19 which is connected to the valve sleeve 12.

Furthermore, the valve cartridge 10 comprises at least one first fluid opening 19.1, at least one second fluid opening 19.2, a preliminary stage 20 with a first valve seat 24 and an axially movable first closing element 26, and a main stage 30 with a second valve seat 34 and an axially movable second closing element 36.

As can be seen, furthermore, from FIGS. 1 and 2, the first valve seat 24 is arranged at a first axial through opening 38 of the second closing element 36. In addition, the second closing element 36 is arranged at least in sections in a preliminary stage sleeve 22, the first valve seat 34 being arranged within the preliminary stage sleeve 22. A flow path from the first fluid opening 19.1 to the preliminary stage 20 leads through at least one inflow opening 44 in the preliminary stage sleeve 22, which inflow opening 44 is made radially in the preliminary stage sleeve 22. In addition, an axial filter gap 42 is configured between an actuating element 16 and the preliminary stage sleeve 12. Here, the at least one inflow opening 44 and the axial filter gap 42 overlap at least in regions and together configure a filter 40 in the flow path. Therefore, a width of the filter gap 42 defines a first dimension, and a diameter of the at least one inflow opening 44 defines a second dimension for the dirt particles 9 to be filtered.

As can be seen, furthermore, from FIGS. 1 and 2, the second closing element 36 is arranged in the preliminary stage sleeve 22 in an axially movable manner. Here, a compression spring 28 is arranged between the preliminary stage sleeve 22 and the second closing element 36, which compression spring 28 is configured as a helical spring in the illustrated exemplary embodiment and presses the second closing element 36 in the direction of the actuating element 16, with the result that the first closing element 26 can seal the first valve seat 24 which is arranged at the axial first through opening 38 in the non-actuated state of the valve 1. As can be seen, furthermore, from FIGS. 1 and 2, the first closing element 26 is configured in the illustrated exemplary embodiment as a closing ball and is connected fixedly to the actuating element 16. The second closing element 36 protrudes with its end which lies opposite the first valve seat 24 through an end-side opening of the preliminary stage sleeve 22.

As can be seen, furthermore, from FIGS. 1 and 2, the valve lower part 19 is configured as a sleeve, into which an annular valve body 32 is pressed. The valve body 32 has a second axial through opening 33 with a greater cross section than the first through opening 38 in the second closing element 36. The second valve seat 34 is configured at said second through opening 33 within the valve lower part 19 which is configured as a sleeve. As an alternative, the second valve seat 34 can be configured at the second fluid opening 19.2 which is made in the sleeve-shaped valve lower part 19. Via the axial movement of the second closing element 36, the second valve seat 34 and therefore the main stage 30 can be opened and closed. The sleeve-shaped valve lower part 19 can preferably be produced as a multiple-stage deep-drawn part. The preliminary stage sleeve 22 and the second closing element 36 protrude into the valve lower part 19, with the result that the second closing element 36 can interact sealingly with the second valve seat 34. At its free end, the valve lower part 19 has a second fluid opening 19.2. Here, the valve lower part 19 is arranged in a fluid block (not shown). As can be seen, furthermore, from FIGS. 1 and 2, a plurality of first fluid openings 19.1 are made as radial bores in a circumferential face of the valve lower part 19. In addition, a radial filter 5 is arranged in the region of the first fluid openings 19.1, which radial filter 5 can retain relatively large dirt particles. The valve 1 can be calked via a calking disk 7 in the fluid block.

As can be seen, furthermore, from FIGS. 1 and 2, at its open end, the preliminary stage sleeve 22 in the illustrated exemplary embodiment is pressed fixedly onto a connecting region 16.1 of the actuating element 16. As an alternative, the attachment of the preliminary stage sleeve 22 to the connecting region 16.1 of the actuating element 16 can be configured as a weld or as a threaded connection. In the illustrated exemplary embodiment, the axial filter gap 42 is configured as a circumferential stepped portion on an end section of the connecting region 16.1 of the actuating element 16. In addition, a plurality of inflow openings 44 are made as radial bores in the preliminary stage sleeve 22 axially at the level of the connecting region 16.1, and open into the circumferential axial filter gap 42.

In an alternative exemplary embodiment (not shown), the axial filter gap 42 is made as an axial groove in the connecting region 16.1 of the actuating element 16. Therefore, in the case of a plurality of inflow openings 44 which are made in the preliminary stage sleeve 22, in each case one filter gap 42 which is configured as an axial groove is aligned with one of the inflow bores 44, in order to configure a corresponding joint filter.

As can be seen, furthermore, from FIGS. 1 and 2, an end region of the axial filter gap 42, which end region overlaps with the inflow opening 44, is configured in the illustrated exemplary embodiment as a feed bevel 46 which brings about a flow deflection by approximately 90° in the illustrated exemplary embodiment. In addition, the feed bevel 44 serves as an insertion bevel for the assembly of the preliminary stage sleeve 22.

As can be seen, furthermore, from FIG. 1, the valve cartridge 10 is introduced with a pole core-side end at least partially into the magnet assembly 3, an upper end of the magnet assembly 3 bearing against the pole core 14, and a lower end of the magnet assembly 3 bearing against the valve sleeve 12. By way of energization of the coil winding 3.3, the magnet assembly 3 generates a magnetic field which moves the actuating element 16 which is configured as a magnet armature counter to the force of a restoring spring 17. A magnetic flux of the generated magnetic field runs through the pole core 14 via the working air gap 18 into the actuating element 16. In the non-energized state which is shown, an air gap 18 is configured between the pole core 14 and the actuating element 16. In addition, the restoring spring 17 is arranged between the pole core 14 and the actuating element 16, which restoring spring 17 presses the first closing element 26 by means of the actuating element 16 into the first valve seat 24 in the non-energized state. Here, the actuating element 16 protrudes with a connecting region 16.1 in sections into the preliminary stage sleeve 12, in which the preliminary stage 20 or the first valve seat 24 is arranged. By way of energization of the coil winding 3.3, a magnetic field is generated by means of the pole core 14, which magnetic field moves the actuating element 16 which is configured as a magnet armature counter to the force of the restoring spring 17 in the direction of the pole core 14 until the actuating element 16 bridges the air gap 18 as far as bearing against the pole core 14. In the illustrated exemplary embodiment, the restoring spring 17 is configured as a helical spring. A damping disk (not shown) can also be arranged between the pole core 14 and the actuating element 16. Said damping disk has the function of slowing the impact speed of the actuating element 16 on the pole core 14 toward the end of the stroke and of reducing the switching shock as a result.

Via the at least one first fluid opening 19.1, the valve 1 can be connected to a primary circuit of the brake system, such as to a brake master cylinder, in which a first pressure P1 prevails. Via the at least one second fluid opening 19.2, the valve 1 can be connected to a secondary circuit of the brake system, such as to a pump device, in which a second pressure P2 prevails.

During operation, two flow directions can be realized by way of the valve 1 which is shown. In a first operating case (reverse overflow), a higher pressure P2 prevails in the secondary circuit which is connected to the second fluid opening 19.2 than in the primary circuit which is connected to the first fluid openings 19.1. By way of energization of the magnet assembly 3, the main stage 30 is opened and the second closing element 36 is lifted from the second valve seat 34, with the result that fluid flows from the second fluid opening 19.2 via the main stage opening and the radial filter into the primary circuit. The radial filter 5 prevents relatively large dirt particles finding a way to the outside into the primary circuit. Said dirt particles 9 get caught on the radial filter 5 in the valve interior.

In a second operating case (normal operation) only the preliminary stage 20 of the valve 1 is opened in the case of a defined pressure range which is generated by way of the primary circuit (brake master cylinder) and in the case of an energized magnet assembly 3. The fluid therefore flows from the first fluid openings 19.2 through the preliminary stage 20 in the direction of the second fluid opening 19.1. As a result, the dirt particles which are situated on the radial filter 5 in the valve 1 are entrained by the flow. On account of the system requirements and the valve design, the preliminary stage 20 or the through opening 38 in the region of the first valve seat 24 has a small diameter and a small stroke. For this reason, relatively large dirt particles 9 might cause jamming of the preliminary stage 20 and/or clogging of the through opening 38. This might lead to a functional failure of the valve 1. By way of embodiments of the present disclosure, said relatively large contaminants or dirt particles 9 now get caught outside the preliminary stage sleeve 22 in or upstream of the inflow openings 44, and are flushed out again in the case of the next actuation of the valve 1. As a result, a functional failure of the valve 1 can be prevented in an advantageous way. Although relatively small dirt particles can pass the radial filter 5 and the inflow openings 44 and the axial filter gap, they are not critical for the preliminary stage 20 or the valve 1 on account of the design with regard to the susceptibility to dirt.

The invention claimed is:

1. A valve for setting a fluid stream, comprising:
   a valve cartridge comprising:
      an actuating element;
      at least one first fluid opening;
      at least one second fluid opening;
      a preliminary stage with a first valve seat and an axially movable first closing element, the preliminary stage including a preliminary stage sleeve in which the first valve seat is arranged; and
      a main stage with a second valve seat and an axially movable second closing element, which is arranged at least partially in the preliminary stage sleeve and which defines a first axial through opening at which the first valve seat is arranged, wherein:
         a flow path is defined from the at least one first fluid opening to the preliminary stage through at least one inflow opening defined in the preliminary stage sleeve, the at least one inflow opening extending radially through the preliminary stage sleeve,
         at least one axial filter gap is defined between an outer surface of the actuating element and an inner surface of the preliminary stage sleeve, each of the at least one axial filter gaps extending in an axial direction, and
         the at least one inflow opening and the at least one axial filter gap at least partially overlap one another such that the at least one inflow opening and the at least one axial filter gap form a filter in the flow path.

2. The valve as claimed in claim 1, wherein the at least one axial filter gap has a width in a radial direction that defines a first dimension, a diameter of the at least one inflow opening defines a second dimension, and the at least one axial filter gap and the at least one inflow opening are configured to filter particles having dimensions greater than the first and second dimensions.

3. The valve as claimed in claim 1, wherein an end region of each gap of the at least one axial filter gap, which overlaps with a corresponding opening of the at least one inflow opening, includes a feed bevel which is angled relative to the axial direction so as to deflect flow through the corresponding opening in the axial direction into the axial filter gap.

4. The valve as claimed in claim 1, wherein the preliminary stage sleeve has an open end at which the preliminary stage sleeve is attached fixedly to a connecting region of the actuating element.

5. The valve as claimed in claim 4, wherein the attachment of the preliminary stage sleeve to the connecting region of the actuating element is configured as one of a press-fit connection, a weld, and a threaded connection.

6. The valve as claimed in claim 4, wherein the at least one axial filter gap is formed by at least one axially extending groove defined in the connecting region of the actuating element.

7. The valve as claimed in claim 6, wherein the at least one inflow opening includes a plurality of inflow openings defined in the preliminary stage sleeve and the at least one axial filter gap includes a plurality of axial filter gaps, each of which is formed as an axial groove of the at least one axially extending groove that is aligned with a respective one of the plurality of inflow openings.

8. The valve as claimed in claim 4, wherein the at least one axial filter gap is configured as a circumferential stepped portion on an end section of the connecting region of the actuating element.

9. The valve as claimed in claim 1, further comprising:
   a valve lower part configured as a sleeve connected in a fluid-tight manner to the valve sleeve.

10. The valve as claimed in claim 9, wherein a valve body is arranged with a second axial through opening within the valve lower part, the second valve seat being defined at the second axial through bore.

* * * * *